United States Patent
Ilda et al.

(10) Patent No.: US 7,160,960 B2
(45) Date of Patent: Jan. 9, 2007

(54) PRESSURE SENSITIVE ADHESIVE COMPOSITION AND SHEET, AND ADHERED ARTICLE

(75) Inventors: Hiroyuki Ilda, Tokyo (JP); Eiichi Takama, Tokyo (JP)

(73) Assignee: Toyo Ink Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 11/061,661

(22) Filed: Feb. 18, 2005

(65) Prior Publication Data

US 2005/0165146 A1    Jul. 28, 2005

(51) Int. Cl.
*C08C 19/04*    (2006.01)
*C08F 8/06*    (2006.01)

(52) U.S. Cl. ............ 525/387; 525/383; 525/386; 427/208.4

(58) Field of Classification Search ......... 524/550; 427/208.4; 260/24; 525/387, 383, 386
See application file for complete search history.

(56) References Cited

U.S. PATENT DOCUMENTS

| | | | | |
|---|---|---|---|---|
| 4,087,392 A | * | 5/1978 | Hartmann et al. | 524/270 |
| 4,636,546 A | * | 1/1987 | Chao | 524/507 |
| 4,935,149 A | * | 6/1990 | Morse | 210/712 |
| 5,141,989 A | * | 8/1992 | Jung et al. | 524/561 |
| 5,143,954 A | * | 9/1992 | Hutton et al. | 524/106 |

* cited by examiner

*Primary Examiner*—Ling-Sui Choi
(74) *Attorney, Agent, or Firm*—Heslin Rothenberg Farley & Mesiti, P.C.

(57) ABSTRACT

An acryl-based solvent-type pressure sensitive adhesive composition comprising a base component containing a solvent soluble acryl-based polymer, a cross-linking agent, and acetyl acetone, is disclosed.

5 Claims, No Drawings

PRESSURE SENSITIVE ADHESIVE COMPOSITION AND SHEET, AND ADHERED ARTICLE

BACKGROUND OF THE INVENTION

1. Field of the Invention

The present invention relates to a pressure sensitive adhesive composition, a pressure sensitive adhesive sheet, and an article adhered thereto. More particularly, the present invention relates to an acryl-based solvent-type pressure sensitive adhesive composition which can reduce an amount of formaldehyde generated by heating.

2. Description of the Related Art

An article adhered by a pressure sensitive adhesive composition has excellent properties in weather resistance, durability, heat resistance, low-temperature resistance, water resistance, or the like, and thus is widely used as a double-sided sticky tape, a foam tape, or the like in applications as a building material, household electrical equipment, wallpaper, airtight tape, masking tape, or the like. As the pressure sensitive adhesive composition used in such an adhered article, a solvent-type pressure sensitive adhesive composition containing acryl-based resin as a main component is used.

Further, it is supposed that the adhered article as above is used in a room of a house. In these cases, some components contained in the pressure sensitive adhesive composition may vaporize and float in air of the room. In such vaporizing substances, formaldehyde, toluene, or other chemical substances may be contained. Such chemical substances are regarded as a cause of the so-called "sick-house" syndrome.

The "sick-house" syndrome can be prevented if a pressure sensitive adhesive composition not containing chemical substances which cause such a syndrome is used for the adhered article placed in a room.

Even if the substances which may cause "sick-house" syndrome are not used, however, formaldehyde is contained in the atmosphere, and formaldehyde in the atmosphere may possibly be trapped in the pressure sensitive adhesive composition. Further, formaldehyde may be also generated by heating. Thus, it is difficult to control formaldehyde.

As a method of decreasing formaldehyde, Japanese Unexamined Patent Publication No. 2-232279 discloses the use of a formaldehyde trapping agent selected from a group consisting of urea, acetyl acetone, and a combination of urea and a promoting agent selected from a group consisting of glyoxal and acetyl acetone, and Japanese Unexamined Patent Publication No. 11-197501 discloses the use of an aldehyde adsorbent agent comprising an active energy ray-curable resin containing an acetoacetyl group. Further, it is known to use urea, thiourea, ethylene urea, dicyanediamide, glyoxalmonourethane, amines, or amides as a trapping agent.

However, ureas are not soluble in a solvent-type pressure sensitive adhesive composition. Further, dicyanediamides or amines easily react with a base component of the solvent-type pressure sensitive adhesive composition, and thus, the pressure sensitive adhesive composition exhibits a poor stability with age when dicyanediamides or amines are used.

SUMMARY OF THE INVENTION

The inventors of the present invention engaged in intensive research to develop an acryl-based solvent-type pressure sensitive adhesive composition from which a pressure sensitive adhesive sheet generating very little, if any, formaldehyde can be formed, and as a result, found that the generation of formaldehyde can be prevented by adding acetyl acetone in the acryl-based solvent-type pressure sensitive adhesive composition.

Accordingly, the object of the present invention is to provide an acryl-based solvent-type pressure sensitive adhesive composition from which a pressure sensitive adhesive sheet generating very little, if any, formaldehyde can be arisen.

Further, another object of the present invention is to provide a pressure sensitive adhesive sheet generating very little, if any, formaldehyde.

Other objects and advantages of the present invention will be apparent from the following description.

In accordance with the present invention, there is provided an acryl-based solvent-type pressure sensitive adhesive composition comprising a base component containing solvent soluble acryl-based polymer, a cross-linking agent, and acetyl acetone.

In accordance with a preferred embodiment of the present invention, there is provided a pressure sensitive adhesive composition wherein acetyl acetone is contained in an amount of 0.01 to 2 parts by weight with respect to 100 parts by weight of the base component.

In accordance with another aspect of the present invention, there is provided a pressure sensitive adhesive sheet comprising a substrate carrying on at least one major surface thereof a layer of the pressure sensitive adhesive composition as above.

In accordance with a preferred embodiment of the pressure sensitive adhesive sheet of the present invention, there is provided a pressure sensitive adhesive sheet, wherein formaldehyde is released in an amount of not more than 0.05 μg/g, when heated in water at 90° C. for 2 hours.

In accordance with still another aspect of the present invention, there is provided an article wherein at least a portion thereof is adhered by the pressure sensitive adhesive composition as above.

According to the present invention, a pressure sensitive adhesive composition having an excellent effect in a reduction of formaldehyde generated, by adding acetyl acetone to an acryl-based solvent-type pressure sensitive adhesive composition comprising a base component containing solvent soluble acryl-based polymer and a cross-linking agent, can be provided.

DESCRIPTION OF THE PREFERRED EMBODIMENTS

The solvent soluble acryl-based polymer constituting the base component of the pressure sensitive adhesive composition according to the present invention may be prepared by polymerizing (meth)acryl-based monomers in solvent.

The solvent soluble acryl-based polymer may be any polymer used in this field, and is for example, a homopolymer of monomers selected from a (meth)acryl-based monomer, for example, a polymerizable monomer having one or more carboxyl groups or one or more groups of an anhydride thereof, such as (meth)acrylic acid, itaconic acid, maleic acid or anhydride, fumaric acid or anhydride thereof, or crotonic acid, or the like; mono(meth)acrylate, such as alkyl (meth)acrylate [such as methyl (meth)acrylate, ethyl (meth) acrylate, butyl (meth)acrylate, 2-ethylhexyl (meth)acrylate, isooctyl (meth)acrylate, lauryl (meth)-acrylate, or the like], 2-hydroxyethyl (meth)acrylate, or the like; di(meth)acrylate, such as diethylene glycol di(meth)acrylate, hexanediol di(meth)acrylate, or the like; tri(meth)acrylate, such as pentaerythritol tri(meth)acrylate, or the like; or (meth)acrylamide, such as (meth)acrylate, N,N-dimethyl (meth)acrylamide, or the like; or a synthetic resin of 2 or more monomers selected from the above monomers, such as a copolymer or a terpolymer. Further, a copolymer of the (meth)acryl-based monomers as above and vinyl compounds other than the (meth)acryl-based monomers as above, such as vinyl acetate, N-vinyl pyrrolidone, N-vinyl piperidine, N-vinyl caprolactam, styrene, or the like may be used.

A solvent which may be used when acryl-based monomers are polymerized, ethyl acetate is not limited, but for example, toluene, acetone, methyl ethyl ketone, or methyl isobutyl ketone, which can be used alone or in combination thereof.

As a polymerization initiator used in the polymerization of the (meth)acryl-based monomers as above, there may be mentioned, for example, an organic peroxide initiator, such as benzoyl peroxide, di-t-butyl peroxide, cumene hydroperoxide, t-butyl peroxybenzoate, t-butyl peroxyneodecanoate, t-butyl peroxy 2-ethylhexanoate, or the like, or an azo-initiator, such as 2,2'-azobis(2-methyl-butyronitrile), 2,2'-azobiscyclohexane carbonitrile, or the like. The polymerization initiator is not limited to the compounds as above, and can be used alone, or in combination thereof. An amount of the polymerization initiator used is not limited, but can be determined in accordance with a composition of a monomer composition, reaction conditions, or the like.

As a chain transfer agent added during the copolymerization, there may be mentioned, for example, an alkyl mercaptan, such as octyl mercaptan, nonyl mercaptan, decyl mercaptan, dodecyl mercaptan, or the like, a thioglycolate, such as octyl thioglycolate, nonyl thioglycolate, 2-ethylhexyl thioglycolate, or the like, 2,4-diphenyl-4-methyl-1-pentene, 1-methyl-4-isopropylidene-1-cyclohexane, or the like. In particular, it is preferable to use the thioglycolates, 2,4-diphenyl-4-methyl-1-pentene, or 1-methyl-4-isopropylidene-1-cyclohexene, because the resulting copolymer has a small odor. An amount of the chain transfer agent used may range from 0.001 to 3% by weight with respect to all the total monomers used. The polymerization reaction is usually carried out at a temperature of 40 to 100° C. for 2 to 12 hours.

The pressure sensitive adhesive composition of the present invention contains the base component containing the (meth)acryl-based polymer as above and the cross-linking agent. The base component may contain one or more (meth)-acryl-based polymers.

The cross-linking agent has functional groups which can be reacted with functional groups contained in the (meth) acryl-based polymer, that is, those introduced from the monomers having a hydroxyl or carboxyl group. An adhesive strength and a cohesive strength can be generated by the cross-linking agent.

The cross-linking agent is not limited, so long as it contains, in the molecule, plural functional groups which can be reacted with the functional groups contained in the (meth)acryl-based polymer. The cross-linking agent includes, for example, a polyfunctional epoxy compound, a poly-functional isocyanate compound, an aziridine compound, a metal cross-lining agent, or the like.

The polyfunctional epoxy compound is not limited, so long as it contains, in the molecule, plural epoxy groups. As the polyfunctional epoxy compound, there may be mentioned, for example, ethylene glycol diglycidyl ether, polyethylene glycol digylcidyl ether, 1,6-hexanediol diglycidyl ether, bisphenol A-epichlorohydrin-epoxy resin, N,N,N',N'-tetraglycidyl-m-xylene diamine, 1,3-bis(N,N-diglycidyl-aminomethyl)cyclohexane, N,N-diglycidyl aniline, N,N-diglycidyl toluidine, or the like.

The polyfunctional isocyanate compound is not limited, so long as it contains, in the molecule, plural isocyanate groups. As the polyfunctional isocyanate compound, there may be mentioned, for example, a diisocyanate compound, such as tolylenediisocyanate (TDI), 4,4'-diphenyldiisocyanate (MDI), hexamethylenediisocyanate, xylylenediisocyanate, methaxylylene diisocyanate, 1,5-naphthalenediisocyanate, hydrogenated diphenylmethanediisocyanate, hydrogenated tolylenediisocyanate, hydrogenated xylenediisocyanate, isophoronediisocyanate, or the like, a burette poly-isocyanate compound, such as Sumidur (Trade name; Sumika Bayer Urethane Co., Ltd.) or the like, a polyisocyanate compound having an isocyanurate ring, such as Desmodur IL or Desmodur HL (Trade name; Bayer AG), Coronate EH (Trade name; Nippon Polyurethane Industry Co., Ltd.), or the like, an addult polyisocyanate compound, such as Sumidur L (Trade name; Sumika Bayer Urethane Co., Ltd.), Coronate L (Trade name; Nippon polyurethane Industry Co., Ltd.), or the like. Further, a blocked isocyanate compound prepared by reacting isocyanate groups contained in the polyfunctional isocyanate compound as above and a masking agent having an active hydrogen which will inactivate one of the isocyanate groups.

As the aziridine compound, there may be mentioned, for example 2,2'-bishydroxymethylbutanol tris[3-(1-aziridynyl)-propionate, 4,4'-bis(ethyleneiminocarbonylamino)-diphenyl-methane, or the like. As the metal cross-linking agent, there may be mentioned, for example, a chelate compound wherein a ligand such as acetylacetone, methyl acetoacetate, ethyl acetoacetate, ethyl lactate, methyl salicylate, or the like is coordinated to a multivalent metal such as aluminium, zinc, cadmium, nickel, cobalt, copper, calcium, barium, titanium, manganese, iron, lead, zirconium, chromium, tin or the like.

The cross-linking agent may be used alone or in combination of the above compounds. An amount of the cross-linking agent used is not limited, but can be determined, taking into account the kind of the (meth)acryl-based polymer and the applications of the pressure sensitive adhesive composition, or the like. The amount is preferably 0.1 to 10 parts by weight, more preferably 0.5 to 5 parts by weight, with respect to 100 parts by weight of the (meth)acryl-based polymer. The cross-linking agent can appropriately adjust a cross-lining density of the (meth)acryl-based polymer, and thus in turn further enhance various properties of the pressure sensitive adhesive composition. When the amount of the cross-linking agent used is less than 0.1 part by weight, the amount may become insufficient and thus the cross-linking density may become too small to obtain a sufficient cohesive strength. When the amount of the cross-linking agent used is more than 10 parts by weight, the cross-linking density and thus the cohesive strength may become too high so that the adhesive strength and tack may be lowered. A method of adding the cross-linking agent to the (meth)acryl-based polymer is not limited.

The base component of the pressure sensitive adhesive composition of the present invention preferably contains a tackifier to enhance the adhesive properties. An adhesive property to an article such as polyolefin to which the pressure sensitive adhesive composition is adhered is improved by adding the tackifier. As the tackifier, there may be mentioned, for example, a terpene resin, an aliphatic petroleum resin, an aromatic petroleum resin, a coumarone-indene resin, a phenol resin, a terpene-phenol resin, a rosin derivative, such as rosin, polymerized rosin, or hydrofined rosin, or an ester thereof with glycerol, pentaerythritol, or the like, a resin acid dimmer, or the like. As the tackifier, the rosin derivative is preferable, and the rosin ester is more preferable.

As the tackifier, the above compounds may be used alone or in combination thereof. As the combination of the tackifiers, there may be mentioned a mixture of two tackifiers, such as terpene resin and aliphatic petroleum resin, aromatic petroleum resin and coumarone-indene resin, terpene-phenol resin and rosin derivative, terpene resin and rosin derivative, aliphatic petroleum resin and rosin derivative, aromatic petroleum resin and rosin derivative, coumarone-indene resin and rosin derivative, phenol resin and rosin derivative, or the like, or a mixture of three or more tackifiers, such as rosin derivative, aliphatic petroleum resin and aromatic petroleum resin. An amount of the tackifier used is preferably 1 to 50 parts by weight with respect to 100 parts by weight of the (meth)acryl-based polymer. When the amount is less than 1 part by weight, an effect of improving the adhesive strength is insufficient. Conversely, when the amount is more than 50 parts by weight, the adhesive strength will be lowered.

An amount of acetyl acetone used in the present invention is preferably 0.01 to 2 parts by weight, more preferably 0.05 to 1 part by weight, with respect to 100 parts by weight of a solid content of the base component containing the solvent soluble (meth)acryl-based polymer. When the amount is less than 0.01 part by weight, an effect of trapping formaldehyde is insufficient. When the amount is more than 2 parts by weight, the effect of trapping formaldehyde is enhanced, but acetyl acetone may remain in a coated layer after drying, and thereby lower the cohesion strength.

Acetyl acetone may be added or incorporated at any step in the method for producing the pressure sensitive adhesive composition of the present invention.

The pressure sensitive adhesive composition of the present invention may contain an additive which is incorporated in a conventional pressure sensitive adhesive composition, such as a filler, pigment, dyestuff, diluent, age inhibitor, ultraviolet absorbing agent, or ultraviolet stabilizer. The above additive may be used alone or in combination thereof. The additive may be used in an amount sufficient to obtain the desired properties, and thus the amount is not limited.

The pressure sensitive adhesive composition of the present invention having the above constitution may be used in any application wherein a conventional pressure sensitive adhesive composition is used.

The pressure sensitive adhesive composition of the present invention may be used to prepare, for example, a pressure sensitive adhesive sheet, a pressure sensitive adhesive tape, a pressure sensitive adhesive label, or a double-sided sticky tape.

A substrate for the above adhesive article is not limited and for example, plastic, such as polyethylene, polypropylene, polyester, polystyrene, polyethylene terephthalate (PET), polyvinyl chloride, polycarbonate, or cellophane; paper, such as woodfree paper, kraft paper, crepe paper, or glassine paper; and fabric, such as woven fabric or non-woven fabric may be used. A shape of the substrate is not limited and for example, a film, sheet, tape, or a plate may be used. The plastic substrate may be a foam.

A method for coating the substrate with the pressure sensitive adhesive composition, that is, a method for producing the adhered article, is not limited, but may be one of various known methods. For example, a method comprising directly coating the substrate with the pressure sensitive adhesive composition, or a method comprising coating a release paper with the pressure sensitive adhesive composition, and then transferring the pressure sensitive adhesive composition onto the substrate, or the like may be used. The pressure sensitive adhesive composition of the present invention is easily coated on a substrate.

An apparatus used for coating the substrate with the pressure sensitive adhesive composition is not limited.

A layer of the pressure sensitive adhesive composition can be formed by coating one side or both sides of the substrate with the pressure sensitive adhesive composition, and drying to integrate the substrate and the pressure sensitive adhesive composition. A drying temperature is not limited. A cross-linked structure is formed, for example, by reacting the functional groups contained in the (meth)-acryl-based polymer and the functional groups in the cross-linking agent, during a drying step. A surface of an article to be adhered may be directly coated with the pressure sensitive adhesive composition, depending on the application. Further, an adhered article such as a film, sheet, tape, or plate of the pressure sensitive adhesive composition or the like may be prepared by coating a release paper with the pressure sensitive adhesive composition, and removing the coating from the release paper.

EXAMPLES

The present invention will now be further illustrated by, but is by no means limited to, the following Examples. In the following Examples, the term "part" denotes parts by weight and percentages (%) are given as percent by weight.

Preparation of Adhesive Sheets

A commercially available polyethylene laminated release paper was coated with a coating solution prepared in Examples 1–3 or Comparative Example 1 mentioned as below for an adhesive composition layer and dried at 90° C. for 1 minute, so that a dried amount obtained was 65 g/m². Then, the adhesive composition layer was adhered to a polyester film (Trade name=Toyobo Ester; 50 µm; Toyobo Co., Ltd.) to obtain an adhesive sheet. The above polyethylene laminated release paper was a paper prepared by heat-sealing a polyethylene layer to a woodfree paper, coating the polyethylene layer with a repellent agent containing a silicone resin as a main ingredient, and drying the layer.

Method for Measuring Formaldehyde

In a glass bottle having a volume of 800 to 1000 mL, 4 mL of distilled water was poured in advance. The release paper was removed from the adhered article (20 cm×10 cm) to obtain a test sample. The test sample was dipped into the distilled water, and allowed to stand at 90° C. for 2 hours, during which formaldehyde was adsorbed in the distilled water. A concentration of formaldehyde in the resulting test solution was measured in accordance with an acetyl acetone method, by colorimetry using a photoelectric spectrophotometer or a photoelectric calorimeter.

Example 1

|  | Parts by weight |
|---|---|
| n-Butyl acrylate | 76.9 |
| 2-Ethylhexyl acrylate | 20 |

-continued

| | Parts by weight |
|---|---|
| Acrylic acid | 3 |
| 2-Hydroxyethyl acrylate | 0.1 |
| Benzoyl peroxide | 0.2 |
| 1-Methyl-4-isopropylidene-1-cyclohexane | 0.05 |
| Ethyl acetate | 85 |

The components of the above composition were copolymerized for 3 hours under reflex. Then, unreacted monomers were copolymerized with 0.2 parts of t-butylperoxy 2-ethylhexanoate. After the reaction was completed, 37 parts of ethyl acetate was added, and the whole was cooled to obtain an acrylic acid copolymer containing 45% non-volatile components. Rosin ester (20 parts) was added to the acrylic acid copolymer, and the whole was diluted with 23.5 parts of ethyl acetate. Further, 1 part of acetyl acetone was added to obtain a pressure sensitive adhesive composition containing 45% non-volatile components. A solution (1.5% by weight) of 45% Coronate L was added to and mixed with 100 parts by weight of the resulting pressure sensitive adhesive composition, and then, the resulting product was as the coating solution used to prepare an adhesive sheet by the method mentioned as above. After heating, formaldehyde was not detected, that is, lower than the limit of detection.

Example 2

| | Parts by weight |
|---|---|
| n-Butyl acrylate | 70 |
| 2-Ethylhexyl acrylate | 20 |
| Vinyl acetate | 6.9 |
| Acrylic acid | 3 |
| 2-Hydroxyethyl acrylate | 0.1 |
| Benzoyl peroxide | 0.2 |
| 1-Methyl-4-isopropylidene-1-cyclohexane | 0.05 |
| Ethyl acetate | 85 |

The components of the above composition were copolymerized for 3 hours under reflex. Then, unreacted monomers were copolymerized with 0.2 parts of t-butylperoxy 2-ethylhexanoate. After the reaction was completed, 37 parts of ethyl acetate was added, and the whole was cooled to obtain acrylic acid copolymer containing 45% non-volatile components. Rosin ester (20 parts) was added to the acrylic acid copolymer, and the whole was diluted with 24.3 parts of ethyl acetate. Further, 0.2 part of acetyl acetone was added to obtain a pressure sensitive adhesive composition containing 45% non-volatile components. A solution (1.5% by weight) of 45% Coronate L was added to and mixed with 100 parts by weight of the resulting pressure sensitive adhesive composition, and then, the resulting product was used to prepare an adhesive sheet by the method mentioned as above. After heating, formaldehyde was not detected, that is, lower than the limit of detection.

Example 3

The procedures disclosed in Example 1 were repeated, except that an amount of acetyl acetone used was reduced to 0.01 part, to obtain a pressure sensitive adhesive composition. A solution (1.5% by weight) of 45% Coronate L was added to and mixed with 100 parts by weight of the resulting pressure sensitive adhesive composition, and then, the resulting product was used to prepare an adhesive sheet by the method mentioned as above. After heating, an amount of formaldehyde was measured and the result was 0.3 µg/g.

Comparative Example 1

The procedures disclosed in Example 1 were repeated, except that acetyl acetone was not used, to obtain a pressure sensitive adhesive composition. A solution (1.5% by weight) of 45% Coronate L was added to and mixed with 100 parts by weight of the resulting pressure sensitive adhesive composition, and then, the resulting product was used to prepare an adhesive sheet by the method mentioned as above. After heating, an amount of formaldehyde was measured and the result was 0.4 µg/g.

As above, the present invention was explained with reference to particular embodiments, but modifications and improvements obvious to those skilled in the art are included in the scope of the present invention.

We claim:

1. An acryl-based solvent-type pressure sensitive adhesive composition comprising a base component containing a solvent soluble acryl-based polymer, a cross-linking agent, and acetyl acetone.

2. The pressure sensitive adhesive composition according to claim 1, wherein acetyl acetone is contained in an amount of 0.01 to 2 parts by weight with respect to 100 parts by weight of the base component.

3. A pressure sensitive adhesive sheet comprising a substrate carrying on at least one major surface thereof a layer of the pressure sensitive adhesive composition according to claim 1.

4. The pressure sensitive adhesive sheet according to claim 3, wherein formaldehyde is released in an amount of not more than 0.05 µg/g, when heated in water at 90° C. for 2 hours.

5. An article wherein at least a portion thereof is adhered by the pressure sensitive adhesive composition according to claim 1.

* * * * *